June 17, 1952  W. G. SPENCER  2,600,586
AUTOMATIC BICYCLE TRANSMISSION
Filed April 16, 1949  4 Sheets-Sheet 1
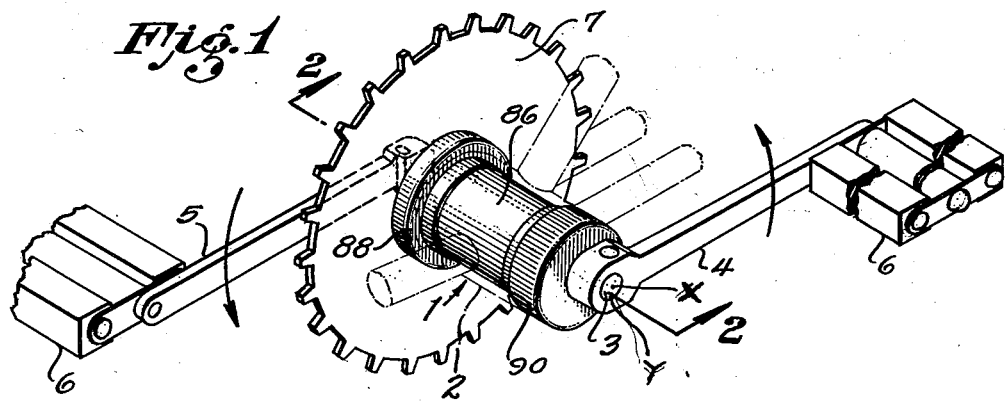
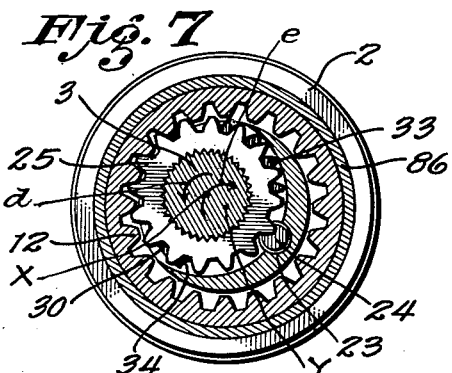
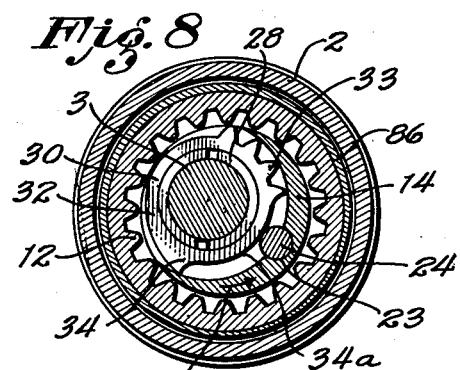
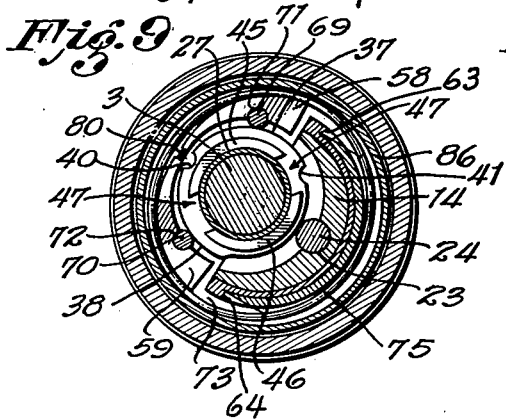
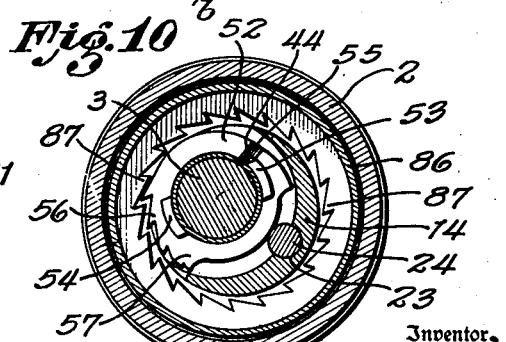
Inventor,
WILLIAM G. SPENCER
By *[signature]*
Attorney June 17, 1952 W. G. SPENCER 2,600,586
AUTOMATIC BICYCLE TRANSMISSION
Filed April 16, 1949 4 Sheets-Sheet 2
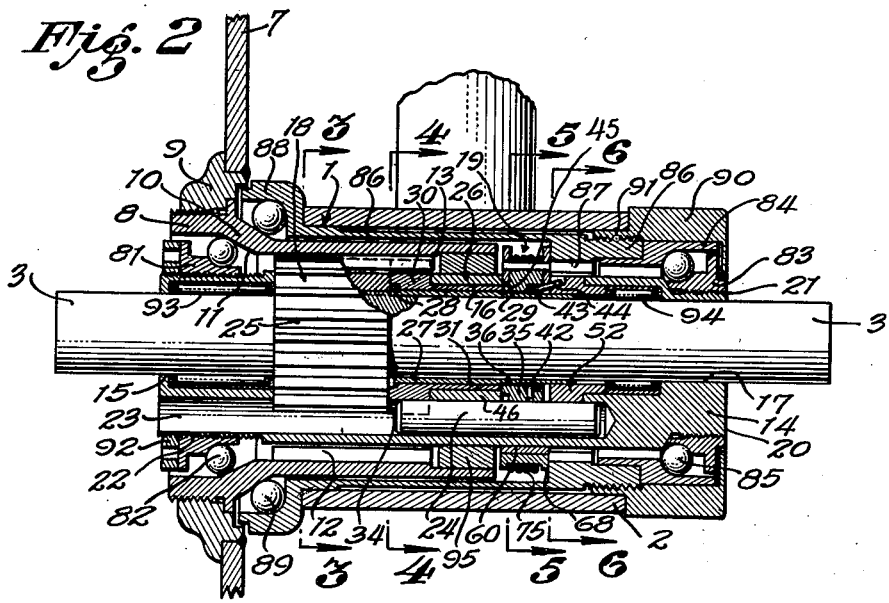
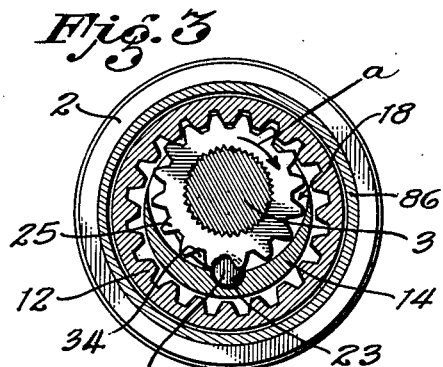
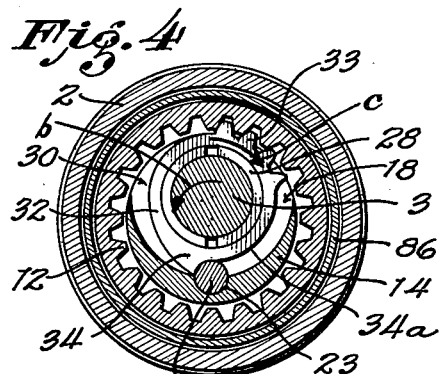
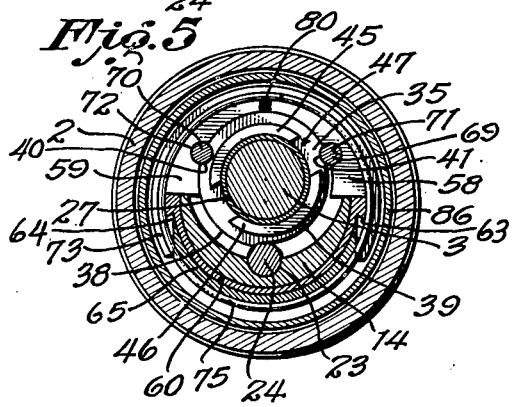
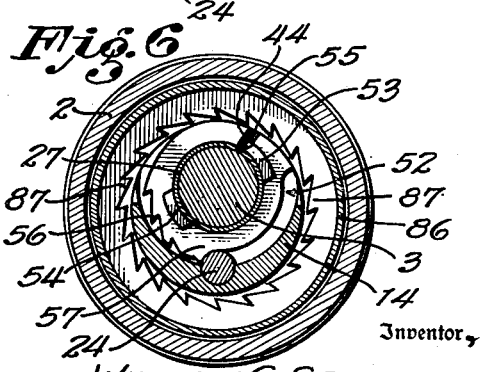
Inventor,
WILLIAM G. SPENCER
By
Attorney

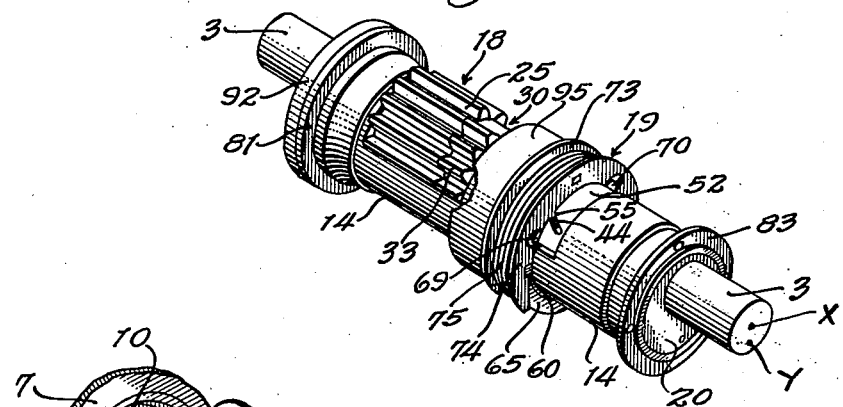
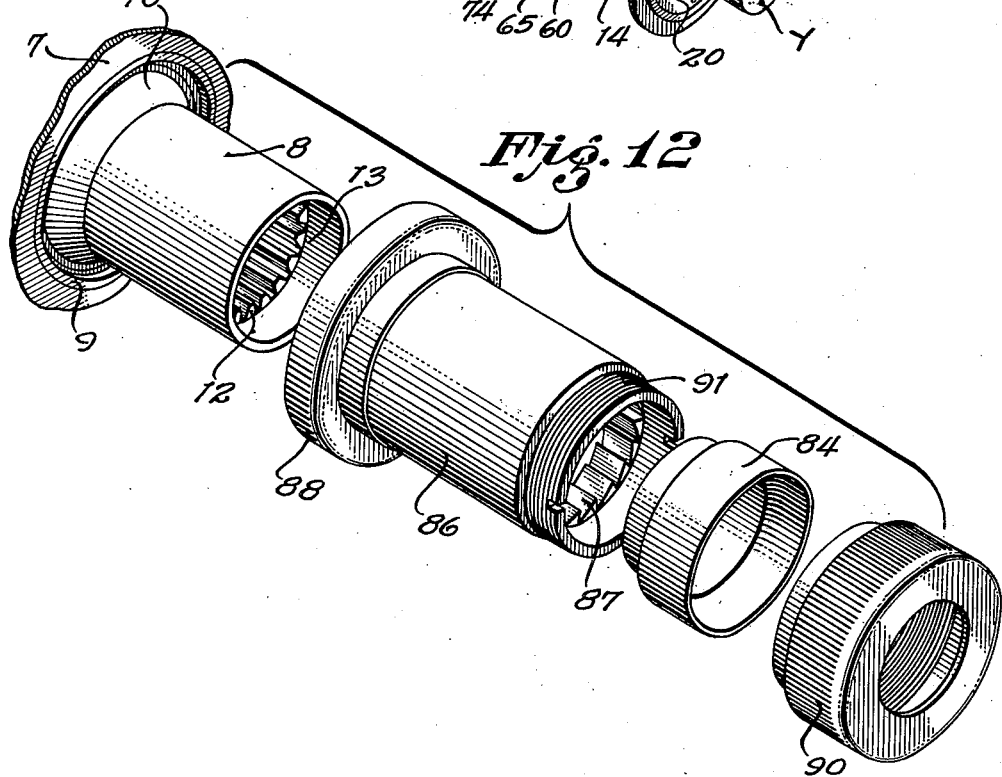

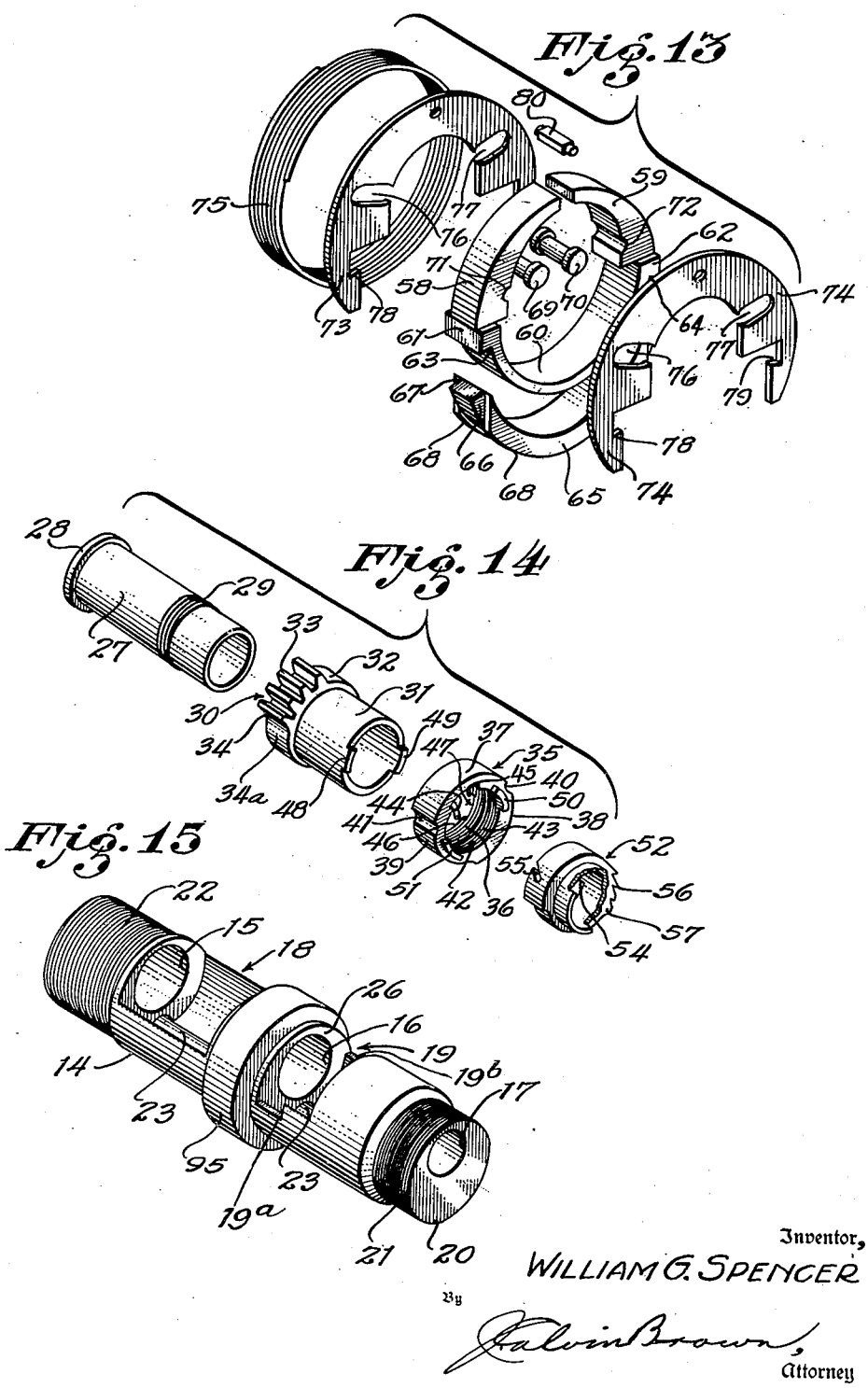

Patented June 17, 1952

2,600,586

UNITED STATES PATENT OFFICE 2,600,586

AUTOMATIC BICYCLE TRANSMISSION

William G. Spencer, Burbank, Calif.

Application April 16, 1949, Serial No. 87,979

7 Claims. (Cl. 74—751)

1

The present invention relates to an automatic transmission for use on power or manual driven mechanisms generally, and particularly, on bicycles.

An object of the invention is the provision of a device which may be substituted for the ordinary crank shaft of a bicycle without entailing change in the crank hanger box. Generally, the crank shaft carries a spocket wheel between which and a small sprocket carried by the rear wheel of the bicycle, a continuous chain is passed. The present invention is in compact form and is substituted for the crank shaft.

A further object of the invention is the provision of a bicycle transmission the ratio of which is changed by the rider of the bicycle through the simple expedient of applying a sudden thrust force against the pedals. By way of example, if it becomes necessary to rapidly revolve the driving crank while the rear wheel is propelled at a slower speed of revolution, the transmission gearing is shifted. The construction of the invention is such that the transmission will not of necessity shift during ordinary pedaling, whether the pedaling be for uphill, or on level surface. The construction of the transmission requires an impact or increase of torque upon the pedals to cause shifting from high to low gear.

A further object of the invention is the provision of a transmission which does not require any external control for effecting a change in speed, such as ordinarily practiced in motorcycle or bicycle transmissions. The inventor is aware that prior investigators in this art have provided a change speed mechanism consisting of a plurality of gears adapted to intermesh, with certain of the gears adapted to be shifted to provide for change in speed; but in every instance, so far as the inventor is aware, such mechanism has required the use of linkage and a hand operated lever to effect a shifting of the gears.

A further object of the invention is the provision of a bicycle transmission which is simple of construction, inexpensive in cost of manufacture, easily repaired, does not require an expert to install the same in a bicycle, which may be standardized for bicycles of different makes, and which is superior to devices for effecting a change in speed in bicycles now known to the inventor.

With the above-mentioned and other objects in view, the invention consists in the novel and useful provision, formation, construction, association, and relative arrangement of parts, members

2 and features, all as shown in one embodiment in the accompanying drawings, described generally and more particularly pointed out in the claims.

In the drawings,

Figure 1 is a fragmentary perspective view of the device of the invention shown incorporated within the driving sprocket hanger box of a bicycle;

Figure 2 is an enlarged fragmentary sectional view on the line 2—2 of Figure 1, the mechanism being in what is known as high gear relationship;

Figure 3 is a sectional view on the line 3—3 of Figure 2;

Figure 4 is a sectional view on line 4—4 of Figure 2;

Figure 5 is a sectional view on line 5—5 of Figure 2;

Figure 6 is a sectional view on line 6—6 of Figure 2;

Figure 7 is a sectional view similar to Figure 3, certain of the parts being in moved relationship and in the act of shifting to low gear;

Figure 8 is a view similar to Figure 4 with parts in moved relationship, and in the act of shifting to low gear;

Figure 9 is a cross sectional view similar to Figure 5, the parts being in moved relationship;

Figure 10 is a sectional view similar to Figure 6, the parts being in moved relationship;

Figure 11 is an assembled perspective view of parts of the invention which are normally confined within a casing, the said figure showing the drive gear, the shifting gear segment, and associated mechanism for actuating the said gear segment to maintain either a high gear, or a low gear drive;

Figure 12 is a separated perspective view of parts which cooperate with the mechanism of Figure 11;

Figure 13 is a separated perspective view of the cam release assembly;

Figure 14 is a separated perspective view of the shifting gear assembly; and

Figure 15 is a perspective view of an eccentric sleeve shaft used in the practice of the invention.

Referring now with particularity to the drawings, the improved bicycle transmission is designated as an entirety by 1, and the same is adapted to be carried within the crank box 2. The box ordinarily axially confines a shaft upon which is mounted a sprocket wheel and a pair of cranks provided with pedals. The sprocket wheel drives a continuous chain, the chain in turn driving a small sprocket secured to the rear bicycle wheel. In practicing the present invention, I remove the ordinary shaft with its bearings and cups from the crank box 2 and insert within the box the transmission of the present invention.

The function of the transmission of the invention is to provide a change gear ratio so that the bicycle rider may climb a hill with ease, or pedal in the normal manner when on a level course.

The present invention differs from ordinary transmissions for bicycles which include a gear shift mechanism operated by the rider upon hand actuation of a lever and cable or linkage placed adjacent the handle bars or at some location on the bicycle frame. The present invention affords a shifting by actuation of the cranks so that during a pedaling operation control of gear shifting is through the cranks, the hands at all times remaining free for steering the bicycle.

My completed transmission comes in what may be termed a "cartridge" in that it is fully assembled and ready for insertion within the crank box 2, after which the cranks are secured to the shaft, and the device is ready for operation.

Referring to Figure 1, the transmission includes a shaft 3, to which are secured cranks 4 and 5 carrying the usual pedals designated generally as 6. The driving sprocket 7, Figure 2, is not secured directly to the shaft 3, as is ordinary practice, but is secured to means 8 comprising a sleeve by means 9 which consists of a nut having screw engagement with one end of the means 8 and a fixed engagement with the sprocket. The sleeve of the means 8 has a flared end portion 10 to provide a bearing race 11, and the said sleeve is internally provided with longitudinally extending gear teeth 12 which will be designated hereinafter as the internal drive gear. This sleeve is enlarged as to internal bore diameter at 13.

The shaft 3 is passed through what is termed the eccentric sleeve shaft 14 (see Figure 15). The eccentric sleeve shaft has co-axial bores at 15, 16 and 17 which are eccentric to the axis of the sleeve shaft 14 and as a consequence, the shaft 3 which is passed through the bores 15, 16 and 17 is eccentric to the axis of the sleeve shaft 14. The eccentric sleeve shaft 14 is semi-cylindrically cut away at two spaced zones and the shaft 14 at said zones is provided with eccentric semi-circular concavities 18 and 19. The shaft 14 has a reduced diameter end at 20 which is externally screw threaded at 21. The opposite end 22 is externally screw threaded and provided with a longitudinal bore 23, as shown in Figure 2. This bore is exposed in the form of a groove in the concavities 18 and 19, as shown in Figures 2 and 15. This construction permits a key 24 to pass through the bore at one end of the sleeve shaft, as shown in Figure 2. This key acts as a stop for elements of the invention to be described.

A gear 25 is splined or otherwise secured to the shaft 3, the said gear being positioned within the concavity 18. The gear is adapted to mesh with the teeth 12 of the sleeve 8. It will be observed that the teeth 12 are of greater length than the length of the teeth on the gear 25. One of the members of the shifting gear assembly (Figure 14) is confined within the concavity 18 adjacent gear 25, and sleeve portion 26. The shifting gear assembly is illustrated in Figure 14 and the same includes a sleeve 27 having an external flange 28 at one end thereof, and intermediate screw threads at 29. The shifting gear segment 30 is carried on the sleeve 27 between the flange 28 and the threads 29. The shifting gear segment 30 includes a hub 31 having an enlargement at 32 provided with a segment of teeth 33. The enlargement carries a "stop" portion at 34 (see Figure 8). The shifting gear segment 30 has a pitch diameter equal to the pitch diameter of gear teeth 12 and has its hub located eccentric to the center of its pitch diameter. All teeth on gear segment 30, save one, are shaved in a manner to reduce the addendum of each succeeding tooth so that the radii from the hub to the extremities of all teeth on the segment are equal to the radii from the center of shaft 3 to the extremities of the teeth of pinion gear 25.

As shown in Figure 8, the external diameter of the sleeve is on a constant radius from one of the teeth 33 to the stop 34, as shown at 34a. The key 24 is adapted to be confined within this particular area or segment of the shifting gear. Thus, by way of example, movement of the shifting gear segment is stopped by the key 24 when one of the teeth 33 engages the same or by the stop 34.

As shown in Figure 2, the sleeve 27 is carried on the shaft 3 and the hub 31 is confined within the bore 16. The sleeve 27 bridges the concavity 19 and mounted on said sleeve and within said concavity 19 is a shifting cam 35. The shifting cam is internally screw threaded at 36 for engagement with the screw threads 29 of the sleeve 27.

The shifting cam has two raised segmental edge cam surfaces 37 and 38 and a depressed segmental cam surface 39. Separating the cam surfaces 37 and 38 is a transverse groove 40, and lying between an end of cam surface 37 and surface 39 is a transverse groove 41. The shifting cam is internally annularly grooved at 42 to accommodate a coil spring 43, one end 44 of which projects from a side of the shifting cam. One side of the shifting cam is provided with a pair of circular flanges 45 and 46 as shown in Figure 14 providing therebetween a diametric way 47 within which way is received the projecting end lugs 48 and 49 of the hub 31, so that the hub is correctly positioned with respect to the shifting cam. The opposite side of the shifting cam is provided with a pair of spaced-apart arcuate end flanges 50 and 51, which flanges cooperate with flanges carried by the part known as the low gear lock 52, and which forms a member of the shifting gear assembly.

Referring to Figure 6, the low gear lock 52 is provided on one end with a diametric pair of segmental flanges 53 and 54 and with a groove 55 adjacent one end of flange 53, which groove is adapted to receive the end 44 of the spring 43. The low gear lock and the shifting cam are adapted to be in abutting relationship, the segmental end flanges 53 and 54 lying adjacent the segmental flanges 50 and 51, and in such a manner that said flanges may be in contact to limit any rotative movement between the shifting cam and the low gear lock in one direction. The low gear lock 52 is provided with a segmental ratchet tooth portion 56 and with a raised portion 57 which functions as a stop. The portion 57 is adapted to have engagement with the key 24 to limit rotation of the low gear lock in one direction. As shown in Figure 2, both the shifting cam and the low gear lock are confined within the concavity 19 and are carried upon the shifting assembly sleeve 27, the arrangement being such that the low gear lock is capable of rotation upon the sleeve while the shifting cam is locked to the sleeve by means of the screw threads 29 and 36.

Adapted to surround the shifting cam 35 is mechanism designated as the cam release assembly and illustrated in Figure 13. The cam release assembly includes a pair of arcuate shoes 58 and 59, a split annular member 60 called a keeper and having enlarged or thickened end portions 61 and 62 which are transversely undercut at 63 and 64. A semi-circular member 65, constituting a spring retainer, is adapted to fit against the periphery of the keeper 60 with the ends thereof engaging the undercut portions 63 and 64. The ends of the retainer are reduced in width to provide shoulders at 66 and 67, and parallel edge flanges are provided at 68.

A pair of rollers 69 and 70 are received within transverse grooves 71 and 72 of the shoes 58 and 59. Each roller is provided with headed ends so as to hold the respective rollers against lateral shifting within the grooves 71 and 72. Roller retainers 73 and 74 are provided for sides of the shoes, keeper and spring retainer. However, prior to assemblage of the roller retainers in position, a coiled tension spring 75 is positioned so as to surround the shoes and spring retainer as illustrated in Figures 2 and 11. When the roller retainers 73 and 74 are in position, the spring is prevented from escaping from its engagement with the shoes and spring retainer.

The roller retainers comprise in each instance, plates conforming in outline to the curvature of the shoes and provided with slots 76 and 77 which receive the heads of the rollers 69 and 70 and permit movement of the heads within the said slots. These retainers have undercut portions 78 and 79 which engage the undercut portions 63 and 64 of the keeper, and are received within the shouldered portions 66 and 67 of the spring retainer. The roller retainers are held in position by a pin 80 which passes between the shoes 58 and 59, see Figure 13. When the cam release assembly surrounds the shifting cam 35, the rollers 69 and 70 will, in the position shown for the parts in Figure 2, be positioned between the grooves 41 and 71 and 40 and 72, see Fig. 5. In other words, pairs of these grooves will be complementarily positioned. The tension spring 75 will hold the rollers within said pairs of grooves and prevent the escape of the rollers therefrom, except upon the occurrence of a sudden impact force sufficient to cause separation of the shoes under spring tension when the shifting cam rotates and positions the rollers on the cam surfaces 37 and 38, as for instance illustrated in Figure 9. As stated the normal position for the rollers would be that illustrated in Figure 5.

Assuming an assembly of parts such as illustrated in Figure 11, less the cones 81 and 83, the assembly is positioned in sleeve 8 with gear 25 and gear segment teeth 33 engaging teeth 12, see Figures 2, 3 and 4. To maintain this assembly within the sleeve, I have provided the cone 81 which has threaded engagement with threads 22 of the eccentric sleeve shaft and included between the race of the cone and the race 11 are ball bearings 82. Secured to the threads 21 of the sleeve shaft is the cone 83. A race member 84 is positioned adjacent cone 83 with ball bearings 85 interposed between said races.

The race member 84 is held in position by an annular case 86, it being observed that the race member 84 has a reduced diameter portion which fits within the confines of one end of the case. The annular case is provided with internal ratchet teeth 87, which teeth are positioned immediately adjacent the low gear lock 52, see Figure 2. The case 86 is provided at one end with an annular race member 88. The construction is such that when the case is confined within the box 2, one end of the box will bear against the external surface of the annular race member. Ball bearings 89 are interposed between the race member and the sleeve 8.

A cap 90 is in threaded engagement with the case at 91 which cap bears against the opposite end of the box, and thereby secures the case against lateral shifting within the box. Thus, the parts when assembled, have the relationship shown in Figure 2. The diameter of the case is such as to fit within the crank hanger box of conventional size, and as the transmission is fully assembled, all that need be done is to screw the cap 90 onto the threads of the case and against the opposite end of the box to correctly position the transmission therein. Thereafter, crank arms 4 and 5 are secured to ends of the shaft 3.

Figure 12 shows the case, the left bearing cone 84, and the cap 90. The sleeve 8 to the left of the showing of Figure 12 fits within the case. Various locking arrangements may be resorted to for the left and right cones, as for instance, illustrated for the right cone, at 92. In the practice of the invention, I provide needle bearings between the shaft 3 and the eccentric sleeve shaft, as shown at 93 and 94.

To properly stabilize the structure, I have provided a bronze bearing 95 which surrounds portion 26 of the eccentric sleeve shaft and is in engagement with the portion 13 of the sleeve 8.

The operation, uses and advantages of the invention just described, are as follows:

Assuming the parts in position, as illustrated in Figures 1 and 2, with the sprocket upon the right side of the bicycle frame, looking toward the handle bars, that is, forwardly, the direction of rotation of the sprocket 7 to propel the bicycle forwardly will be that indicated by the arrows adjacent the cranks 4 and 5, in other words, clockwise rotation. In this position of the parts, the teeth of the gear 25 and the teeth 33 of the shifting gear segment 30 engage the teeth 12 of the sleeve 8. Thus, as the shaft 3 is rotated, rotation is communicated directly through the gears 25 and 12 to produce direct rotation of the sleeve 8 and of the sprocket 7 with gear segment 30 serving to prevent eccentric action of the sleeve shaft 14. In other words, there is a locked relationship between the gears. This locked relationship is illustrated in Figures 3 and 4.

In this locked relationship, the rollers 69 and 70 are between the grooves 71 and 72 of the shoes 58 and 59, and the grooves 40 and 41 of the shifting cam 35. All of these members will, therefore, rotate with rotation of the shaft 3 and of the eccentric sleeve shaft 14. As the shaft 3 is eccentric within the sleeve shaft 14, such rotation will produce a slight eccentricity in the pedaling. Experience has taught, however, that this slight eccentricity of rotation is hardly noticeable to the bicycle rider.

During this pedaling, the stop 34 of the shifting gear segment 30 is in engagement with the key 24, see Figure 4. Furthermore, the stop 57 of the low gear lock engages the same key 24. In this position the ratchet teeth of the low gear lock are free of engagement from the ratchet teeth 87 of the non-rotatable case 86.

It will be observed that the shifting assembly shown in Figure 14 is freely carried upon the shaft 3. The cam release assembly of Figure 13 cooperates with the shifting cam of the shifting assembly of Fig. 14 in the manner shown in Figure 2. The eccentric sleeve shaft of Figure 15, which is formed with eccentric semi-circular concavities 18 and 19, provides shoulders at 19a and 19b, and the roller retainers 73 and 74 and the arcuate shoes 58 and 59 bridge the shoulders (see Fig. 5) in such a manner that rotation of the eccentric sleeve shaft produces simultaneous turning movement of the cam release assembly. While pedaling in high gear, the teeth 33 and the teeth of gear 25 are in the position shown in Figure 11, and both engage the gear 12. As a consequence, the completed assembly shown in Figure 11 rotates, as does likewise the sleeve 8 within the non-rotatable case 86.

Therefore, in high gear, the drive shaft 3, the sleeve shaft 14 and the gear 12 along with their component parts, rotate as a locked assembly. When in second speed the sleeve shaft 14 is locked in a stationary position and the rotating drive shaft pinion gear 25 drives the gear 12 at a reduced speed. The automatic shifting assembly consists of: a gear segment 30; a cam 35; release rollers 69 and 70 and shoes 58 and 59 which are incorporated in a torque measuring device (Fig. 13); a low gear lock 52 and non-rotatable ratchet-type teeth 87 which are attached to the case 86. When pedaling in high gear both the sleeve shaft 14 and the gear 12 are rotating as a locked assembly. Note that the drive shaft and all members of the shifting assembly (with the exception of the non-rotatable ratchet teeth) are being carried with the sleeve shaft and travel in an orbit around the axis of the sleeve shaft, in a manner similar to planetary gears when locked to a sun gear, with the exception that the driving force is applied to the planetary gear equivalent. Therefore, the direction of forces (when viewed from the sprocket side with the bicycle being propelled forward) is such that the drive shaft 3 attempts to rotate clockwise about its planetary axis and that the drive shaft axis attempts to travel in its orbit counterclockwise about the "sun" axis of the sleeve shaft 14. However, actual rotation of these members, in relation to each other, is prevented by the gear segment 30 which is at this time engaged with gear teeth 12 and which is also locked to the sleeve shaft by means of rollers imbedded in grooves 40 and 41 provided in the attached cam 35 and roller retainers 71 and 72 in the release shoes, which bear against the sleeve shaft. Therefore, the drive shaft 3 merely functions as attachment points for the cranks 4 and 5 and the driving force is transmitted, by lever action, to cause rotation of the entire assembly about the common axis of the sleeve shaft 14 and gear 12 in a clockwise direction. As the torque on the drive shaft is increased, the counter forces, resulting from the engagement of the pinion gear 25 and the gear 12, increase with the result that the drive shaft 3 seeks to travel its planetary orbit in an opposite direction to the rotation of gear 12. The forces exerted along the planetary orbit are transmitted through the gear segment 30 to the cam 35 which attempts to rotate and which in turn attempts to force the rollers 69 and 70 out of grooves 40 and 41 in the cam. A coiled tension spring 75, which functions as a torque measuring device holds the rollers in their respective grooves. If the forces transmitted to the cam are sufficient to overcome the tension of this spring, the cam 35 and gear segment 30 will rotate on the planetary axis and the teeth 33 of the gear segment 30 will move in eccentric relation to the gear teeth 12 until they are no longer in engagement. Coupled to the cam 35 and gear segment 30, by means of a coil coupling spring 43, and on the same planetary axis, is a low gear lock 52 which is rotated in an eccentric relation to the sleeve shaft and moves into position to mesh with the non-rotatable ratchet teeth 87, thus locking the sleeve shaft to the case 86. The release shoes 58 and 59 are employed to increase inertia which must be overcome before shifting takes place, with the result that sudden shock forces applied to the drive shaft are more effective than a gradual increase of torque. The coil spring 43 between the cam 35 and low gear lock 52 serves to facilitate alignment regardless of the position in the planetary orbit at the time shifting occurs.

If low gear is desired, a sudden impact upon one of the pedals 6 in the direction of the arrows of Figure 1 will cause a shifting of the gears so that the rear wheel is now driven by gear 25, rotating the gear 12. As long as the teeth 33 and the teeth of gear 25 are in alignment, as shown in Figure 11, with both engaging gear 12, the gear 25 cannot rotate. However, when sudden impact is made on the pedals, a portion of the impact force is transmitted through the gear segment 30 to the cam 35, forcing rollers 69 and 70 from grooves 40 and 41. The gear segment 30 then functions as a gear to rotate the cam 35 into position shown in Figure 9, whereupon the teeth 56 of the low gear lock 52 engage the ratchet teeth 87 to complete the rotation of gear segment 30 and thus completely release teeth 33 from engagement with gear 12.

The dot X and the dot Y represent the center of rotation of the eccentric shaft 3 and the eccentric sleeve shaft 14, respectively. The distance between these shafts is the amount of eccentricity of the eccentric shaft 3 with respect to the eccentric sleeve shaft 14.

Referring to Figure 3, the turning effort to drive gear 25 is in the direction of the arrow a. It is to be remembered that gear 25 is eccentric to the axis of the internal gear 12. There is, therefore, a slight lever arm due to the difference between the axes and the tendency of the eccentric sleeve shaft 14 is to rotate in the direction of the arrow b, which is directly opposite to the direction of rotation of gear 25. In other words, the gear 25, assuming gear 12 is stationary, attempts to climb around the teeth of said gear, and this attempt to climb imposes a rotation upon the eccentric sleeve shaft.

As the eccentric sleeve shaft is rotated in the direction of the arrow b, the shoes 58 and 59, as well as the roller retainer members 73 and 74, will turn with the eccentric sleeve shaft for the reason that these members are in direct contact with the shoulder portions 19a and 19b of said eccentric sleeve shaft. As the teeth 33 of the shifting gear segment are still in engagement with the teeth 12, as shown in Figure 4, the rollers 69 and 70 will then leave the grooves 40 and 41 and be received upon the cam surfaces 37 and 38 of the shifting cam (see Fig. 9), it being remembered that the shifting assembly of Figure 14 are all interconnected for simultaneous rotation.

The direction of movement of the shifting gear segment is in accordance with the arrow c (Fig. 4), and as the direction of movement of the eccentric sleeve shaft is in accordance with the arrow b (Fig. 4) due to eccentricity between the axis of gear 12 and the eccentric sleeve shaft 14, the teeth 33 will leave the gear teeth 12 in the manner shown in Figure 8. In so leaving, the ratchet teeth of the low gear lock are brought into engagement with the ratchet teeth 87 of the non-rotatable case 86. This engagement prevents any further counterclockwise rotation of the eccentric sleeve shaft 14. It is obvious that when this occurs, gear 25 will rotate the gear 12.

If now it is desired to return to high gear, a reverse pressure is made upon the pedals in a direction opposite to that of the arrows of Figure 1. This reversed pressure will restore the shifting gear to the position shown in Figure 11. To accomplish this, assume that the parts are not in movement, and referring to Figures 7 to 10, reversed pressure on the pedals will cause gear 25 to follow the internal gear 12 by rotating in a counterclockwise direction with respect to the center X, as indicated by the arrow d in Fig. 7. The eccentric sleeve shaft 14 will rotate in a clockwise direction about the center Y of the gear 12, as indicated by the arrow e of Fig. 7.

As the shaft 3 rotates about the center Y, the low gear lock 52 will be rotated counterclockwise about the center X, because of the contact of the teeth 56 with the teeth 87. Due to the fact that the low gear lock 52 is resiliently connected with the shifting gear segment 30 through the shifting cam 35, the shifting gear segment 30 will rotate in the same direction with respect to the center X, the teeth 33 thereof being forced to mesh with the internal gear 12.

As the teeth 33 approach full engagement with the teeth 12, they may or may not be exactly in alignment therewith, and if out of alignment, the misalignment will be compensated by the spring 43 which resiliently connects the shifting cam 35 and the low gear lock 52 through its projecting end 44, which is received in the slot 55 in the low gear lock 52. As the teeth 33 engage gear 12, as illustrated in Figure 3, the rollers 69 and 70 drop into depressions 40 and 41, and the shoes 58 and 59 are forced inwardly by the spring 75, thus locking the shifting gear assembly in the high gear position shown in Fig. 11.

It is pointed out that shifting from high to low gear is under control of the cam release assembly. The spring 75 of this assembly may have its tension varied so as to require greater or lesser impact upon the pedals to cause movement thereof relative to cam 35. The cam release assembly, however, does not control the shifting from low gear to high gear, as the shoes 58 and 59 are expanded radially and are not in contact with shoulders 19a and 19b of the eccentric sleeve shaft 14, see Fig. 9.

It will be seen that I have provided a simple device of few parts, which is under the direct pedaling control of the bicycle rider to provide an automatic transmission having a variable speed control as to shifting by a sudden impact upon the pedals in one of two directions. A forward impact in the direction of movement of the bicycle shifting to a low gear, and a slight back movement on the pedals reshifting into high gear.

It is obvious that the invention may be used on power or manual driven mechanisms, other than bicycles.

I claim:

1. In a device of the character disclosed, a drive shaft, a sleeve shaft eccentrically carried on said drive shaft, said sleeve shaft provided with two spaced concavities, a drive gear mounted on the drive shaft and positioned within one of said concavities, a segmental gear mounted on the drive shaft and positioned in the same concavity with the drive gear, an annular cam mounted upon the drive shaft and positioned within the second concavity, said annular cam being secured to the segmental gear whereby movement of said gear produces movement of the annular cam, a sleeve provided with internal gear teeth overlying the first concavity of the sleeve shaft with the teeth thereof in engagement with the teeth of the drive gear and the segmental gear, cam rollers engaging the annular cam, and means surrounding the sleeve shaft in the zone of the second concavity for maintaining said cam rollers in engagement with the annular cam.

2. In a device of the character disclosed, a drive shaft, a sleeve shaft eccentrically carried on said drive shaft, said sleeve shaft provided with two spaced concavities, a drive gear mounted on the drive shaft and positioned within one of said concavities, a segmental gear mounted on the drive shaft and positioned in the same concavity with the drive gear, an annular cam mounted upon the drive shaft and positioned within the second concavity, said annular cam being secured to the segmental gear whereby movement of said gear produces movement of the annular cam, a sleeve provided with internal gear teeth overlying the first concavity of the sleeve shaft with the teeth thereof in engagement with the teeth of the drive gear and the segmental gear, cam rollers engaging the annular cam, means surrounding the sleeve shaft in the zone of the second concavity for maintaining said cam roller in engagement with the annular cam, a non-rotatable annular case enclosing the sleeve provided with an internal gear and the sleeve shaft, said non-rotatable case provided with an annular series of internal ratchet teeth, and a segmental ratchet tooth member yieldingly secured to said annular cam and positioned in the second concavity of the sleeve shaft in position to engage the internal teeth of the case when the segmental toothed member is rotated in one direction.

3. An automatic transmission including a drive shaft, a drive gear carried thereby, a ring gear surrounding the drive gear and in mesh therewith, the axis of the drive gear being eccentric to the axis of the ring gear, a sleeve shaft eccentrically mounted on the drive shaft, a cam loosely carried on the drive shaft, a segmental gear carried by the drive shaft and adapted to mesh with the teeth of the ring gear, the ring gear teeth and the segmental gear teeth having the same pitch diameter, the axis of the segmental gear being in eccentric relation to the normal segmental gear center, and a means carried by the sleeve shaft and movable therewith for holding the cam to prevent rotation of the segmental gear, and upon application of additional thrust to release the cam and permit rotation of the segmental gear to disengage the segmental gear from tooth engagement with the ring gear.

4. An automatic transmission, including a drive shaft, a sleeve shaft eccentrically mounted on the drive shaft, a drive gear fixedly secured to the drive shaft, a driven gear in mesh with said drive gear, a segmental shifting gear and a cam secured thereto, both loosely carried on the drive shaft, and normally in mesh with the teeth of the driven gear, means normally preventing rotation of the cam to prevent rotation of the segmental shifting gear, sudden impact in one of two directions on the drive gear releasing the means for normally preventing rotation of the cam to release said cam and allow counter-rotation of the sleeve shaft relative to the turning direction of the drive gear, to rotate the segmental shifting gear from engagement with the teeth of drive gear.

5. An automatic transmission including a drive shaft, a sleeve shaft eccentrically mounted on the drive shaft, a drive gear fixedly secured to the drive shaft, a sleeve provided with internal gear teeth enclosing a part of the eccentric sleeve shaft, with the teeth of the drive gear in driving relationship with the teeth of the sleeve, means associated with the sleeve adapted to be driven when the sleeve is rotated, a segmental shifting gear carried by the drive shaft and adapted to mesh with the teeth of the sleeve, a cam loosely carried on the drive shaft and fixedly connected to the segmental shifting gear, means to lock the cam to the sleeve shaft, to in turn lock the segmental shifting gear in mesh with the teeth of the sleeve to prevent relative gear rotation.

6. An automatic transmission including a drive shaft to which pedal arms are attached, a sleeve shaft eccentrically mounted upon the drive shaft, a ring gear surrounding the sleeve shaft, a drive gear fixedly carried by the drive shaft and engaging the teeth of the ring gear, a member carried on the drive shaft and provided with a segmental gear for engagement with the teeth of the ring gear, an annular cam secured to said last named member, and means for locking the cam to the sleeve shaft to lock the segmental gear in mesh with the ring gear and thereby prevent relative gear rotation, sudden impact releasing the cam to permit the segmental gear to disengage the ring gear.

7. In a device of the character disclosed, a drive shaft, a sleeve shaft eccentrically carried on said drive shaft, said sleeve shaft provided with two spaced concavities, a drive gear mounted on the drive shaft and positioned in one of said concavities, a segmental gear mounted on the drive shaft and positioned in the same concavity with the drive gear, an annular cam mounted upon the drive shaft and positioned within the second concavity, said annular cam being secured to the segmental gear whereby movement of said gear produces movement of the annular cam, a sleeve provided with internal gear teeth overlying the first concavity of the sleeve shaft, with the teeth thereof in engagement with the teeth of the drive gear and the segmental gear, cam rollers engaging the annular cam to lock the segmental gear in mesh with the ring gear so that the gears cannot rotate relative to each other, means surrounding the sleeve shaft in the zone of the second concavity for maintaining said cam rollers in engagement with the annular cam and means to rotate the segmental gear to a position releasing the ring gear from locked engagement therewith.

WILLIAM G. SPENCER.

REFERENCES CITED

The following references are of record in the file of this patent:

UNITED STATES PATENTS

| Number | Name | Date |
|---|---|---|
| 634,252 | Weber | Oct. 3, 1899 |
| 1,757,995 | Fawick | May 13, 1930 |
| 2,447,136 | Putz | Aug. 17, 1948 |

FOREIGN PATENTS

| Number | Country | Date |
|---|---|---|
| 92,574 | Germany | June 11, 1896 |